United States Patent [19]

Nikolaev et al.

[11] 4,210,865
[45] Jul. 1, 1980

[54] POSITION SENSOR OF LINEARLY MOVING BODIES

[76] Inventors: Vladimir P. Nikolaev, ulitsa Proletarskaya, 58, kv. 91; Leopold I. Chaika, bulvar Trudyaschikhsya, 7, kv. 203, both of Kolpino Leningradskoi oblasti; Ivan V. Ivanov, Pozharny pereulok, 1, kv. 9, Tosno Leningradskoi oblasti, all of U.S.S.R.

[21] Appl. No.: 859,792

[22] Filed: Dec. 12, 1977

[51] Int. Cl.² ............................................. G01R 33/00
[52] U.S. Cl. ............................. 324/207; 176/19 R; 340/195
[58] Field of Search ................. 324/206, 207, 208; 340/195, 196, 199; 318/653, 656, 657, 658; 176/19 R; 73/314, DIG. 5

[56] References Cited

U.S. PATENT DOCUMENTS 3,183,496  5/1965  Goldstien ........................ 340/196

FOREIGN PATENT DOCUMENTS 847158   1/1958  United Kingdom .................... 324/208
435456  12/1974  U.S.S.R. ............................. 324/208

Primary Examiner—Rudolph V. Rolinec
Assistant Examiner—Walter E. Snow
Attorney, Agent, or Firm—Lackenbach, Lilling & Siegel

[57] ABSTRACT

Disclosure is made of a position sensor comprising a plurality of inductance coils with open magnetic circuits. One of the coils has two pairs of poles. The position sensor further includes a shunting element designed for movement along the axis of the coils and connected to a moving body whose position is to be found. The shunting element has groups of holes arranged along its axis. In each group, the holes are arranged along the perimeter of the shunting element. The interpole distance of the coil with the two pairs of poles is specially selected with due regard for the diameter of the holes and the interhole spacing to ensure a high accuracy of the measurements.

1 Claim, 5 Drawing Figures

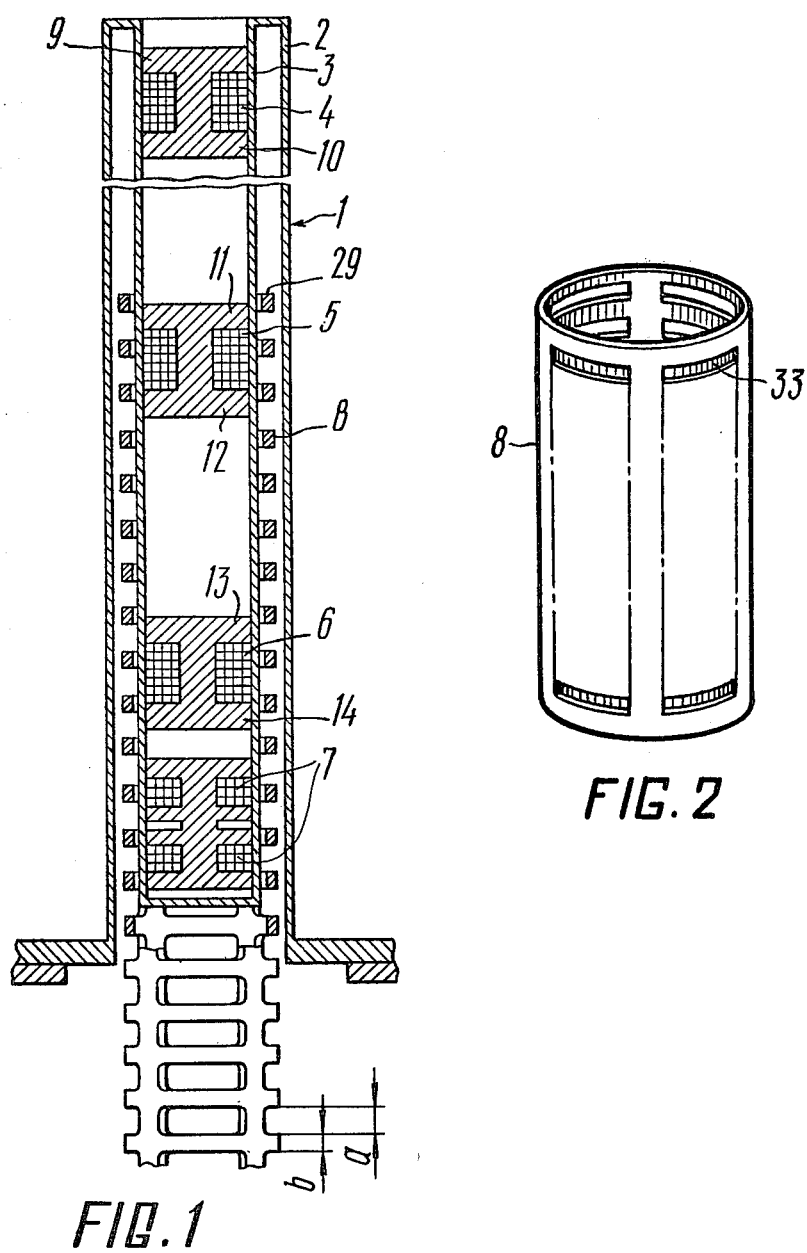

POSITION SENSOR OF LINEARLY MOVING BODIES

FIELD OF THE INVENTION

The present invention relates to devices for finding the position of moving objects and, more specifically, to a position sensor for finding the position of bodies in linear motion. The position sensor of this invention is primarily meant to determine the position of bodies in a sealed vessel, for example, to monitor the position and follow the motion of nuclear reactor controls.

DESCRIPTION OF THE PRIOR ART

There is known a position sensor for finding the position of a body in linear motion (cf. U.S. Pat. No. 3,108,213), comprising coils with a double winding. Inside each of the coils there are arranged a core of a magnetically conducting material and a contact element.

One of the disadvantages of this type of position sensor is the presence of the contact elements which are break and sliding contacts. Such contacts require regular inspection and maintenance, which is difficult to do because they are normally located in hard-to-get-at zones.

Another disadvantage of the above type of position sensor is its inability to maintain a high accuracy of measurements in cases when a body whose position is being followed moves over long distances, for example, distances several meters long (this is especially true of the end portions of the body's path of travel), or when the body moves at a high speed. The reason is the impossibility to ensure a uniform distribution of the magnetic flux over the entire length of travel.

The above disadvantages are eliminated in a position sensor (Federal Republic of Germany Pat. No. 1,281,597) which comprises gas starters arranged along the path of a control member, and a permanent magnet connected to the control memeber and movable in proximity to the gas starters. The contacts of the gas starters are housed in sealed cavities filled with an inert gas so that no maintenance is required. This type of position sensor maintains the same accuracy of measurements over the entire length of travel, which is independent of the speed of travel.

This type of position sensor is disadvantageous in that is contains a permanent magnet whose magnetic properties change with time; such changes are still more pronounced in nuclear reactors due to the effects of radiation. As a result, the measuring accuracy of such a position sensor deteriorates with time.

This disadvantage is avoided in a position sensor (French Pat. No. 2,169,437) comprising a primary winding, a plurality of pairs of secondary windings arranged inside or outside the primary winding, and a ram-type movable member. The ram-type movable member is of a magnetically conducting material and is adapted for movement inside the windings.

While the movable member is in motion, the inductive coupling between the primary and secondary windings varies so that at the output of the primary windings there is produced a signal which carries information on the position of the movable member. The primary winding and the pairs of secondary windings are arranged along the travel path of the movable member. This type of sensor ensures a high accuracy of determining the position of a moving body, which does not deteriorate with time. That notwithstanding, this type of position sensor, too, has a number of disadvantages.

In cases when a body, whose position is followed, moves over long distances (up to several meters), a high accuracy of measurements requires the use of a great number of primary windings because, in order to ensure a high accuracy of measurements, the windings must be spaced at a small distance from one another. The use of a great number of windings, in turn, means an increased consumption of expensive materials (copper and insulation). The primary winding must extend over the entire length of travel of the movable member; however, it is hard to manufacture windings of that length. In addition, the great number of secondary windings accounts for a complicated circuitry of the receiving means (the position indicator).

SUMMARY OF THE INVENTION

It is an object of the present invention to provide a relatively simple position sensor to indicate the position of a body in linear motion, which would ensure a high accuracy of measurements throughout the range of travel of said moving body.

It is another object of this invention to simplify the design of a position sensor for determining the position of a linearly moving body.

It is still another object of the invention to reduce the cost of the position sensor.

The foregoing and other objects of the present invention are attained by providing a position sensor for determining the position of a body in linear motion, comprising inductance coils having open magnetic circuits and coaxially arranged one after the another. A shunting element of a magnetically conducting material is arranged outside the inductance coils and is designed for movement along their axis so as to shunt the open magnetic circuits, whereby a signal is produced in the output circuit of the inductance coils which carries information on the position of the linearly moving body. The shunting element has, according to the invention, groups of holes arranged along its axis, the holes in each group being arranged along the perimeter of the shunting element. One of the inductance coils has at least two pairs of poles, the distance (L) between the extreme poles of this coil being derived from the following formula:

$$L = n(a+b) - \tfrac{1}{2}(a+3b),$$

where
a is the hole width of the shunting element;
b is the distance between the groups of holes of the shunting element; and
n is a natural number beginning with 3.

One of the advantages of the present invention is that it ensures a high accuracy of measurements which is largely determined by the size of the holes and the spacing between the groups of holes, it being easy to ensure desired hole and spacing tolerance in the course of manufacturing a position sensor. It should also be borne in mind that the number of inductance coils in the proposed position sensor is limited, which is due to the fact that the accuracy of measurements is determined by the size of the holes of the shunting element, the spacing between the groups of holes of that element, and the sizes of the inductance coils; the result is a reduced consumption of costly materials. Finally, the limited number of windings makes it possible to use a simple measuring device in the output circuit of the position sensor.

BRIEF DESCRIPTION OF THE DRAWINGS

Other objects and advantages of the present invention will be more readily understood from the following detailed description of a preferred embodiment thereof to be read in conjunction with the accompanying drawings, wherein:

FIG. 1 is a sectional view of a position sensor for tracking a linearly moving body, in accordance with the invention;

FIG. 2 is a perspective view of the shunting element of the position sensor in accordance with the invention;

Figure 3:
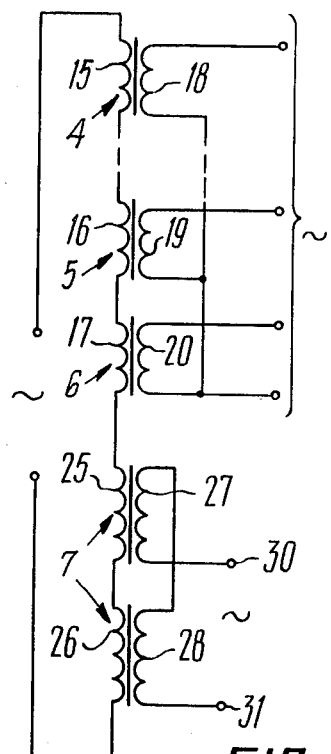
FIG. 3 is a circuit diagram of the windings of the inductance coils.

Consider now FIG. 1, the proposed position sensor comprises a housing 1 of non-magnetic steel, which is composed of two coaxially arranged tubes 2 and 3 interconnected by a jumper or bridge at their upper ends. The position sensor further comprises inductance coils 4, 5, 6 and 7 coaxially arranged one under the other in the internal tube 3 and spaced at some distance from each other. The position sensor also includes a shunting element 8 (which is also shown in FIG. 2) arranged between the tubes 2 and 3. The shunting element 8 is of a magnetically conducting material and is designed for movement along the tubes 2 and 3. The shunting element 8 is connected to a body whose position is to be found.

The inductance coils 4, 5 and 6 are identical, each having an open magnetic circuit with a pair of poles 9 and 10, 11 and 12, and 13 and 14, respectively. Each of the inductance coils 4, 5 and 6 has two windings, i.e. primary windings 15, 16 and 17 and secondary windings 18, 19 and 20, respectively (FIG. 3). The inductance coils 4, 5 and 6 are spaced at some distance from each other and serve to roughly locate the position of a linearly moving body. The spacing between the coils 4, 5 and 6 is selected on the basis of a rough position finding requirement. The number of such coils depends on the estimated length of travel of the body whose position is being tracked. The coil 7 serves for accurate or exact position finding.

The inductance coil 7 (shown more clearly in FIG. 4) comprises an open magnetic circuit with two pairs of poles 21 and 22 and 23 and 24, as well as two primary windings 25 and 26, and two secondary windings 27 and 28. The connection of the windings is clearly shown in FIG. 3.

The primary windings 15, 16, 17, 25 and 26 are connected in series and energized with alternating current.

The secondary windings 27 and 28 are connected in series opposition (the differential circuit). The windings 25, 26, 27 and 28 may be connected into a bridge; in this case the output signal value is double that of the differential circuit. It must be kept in mind, however, that with temperature fluctuations of the windings, the accuracy provided by the bridge circuit is considerably lower than that of the differential circuit which is not affected by temperature fluctuations. For that reason the differential circuit is preferable when the position sensor is subjected to temperature fluctuations, as is the case with nuclear reactors.

The shunting element 8 (FIG. 2) is a tube with groups of cylindrical openings or holes 33 arranged throughout its length and spaced at equal distances from one the other. In each group, the holes are arranged along the periphery of the tube.

The distance L between the extreme poles 21 and 24 of the coil 7 is:

$$L = 3(a+b) - \frac{1}{2}(a+3b),$$

whereas the distance 1 between the poles 21 and 22 and 23 and 24 is equal to "a", where a is the width of a hole of the shunting element; and b is the distance between each of the groups of holes of the shunting element.

If a greater accuracy is needed in determining the position of a body in linear motion and if "a" and "b" are too small for that purpose, the distance between the extreme poles 21 and 24 of the coil 7 is derived from the following formula:

$$L = n(a+b) - \frac{1}{2}(a+3b),$$

whereas the distance 1 between the poles 21 and 22 and 23 and 24 is selected by the formula:

$$1 = (n(a+b))/2 - b,$$

where n is a natural number beginning with n=3 (n = 3, 4, 5, etc.).

No limitations are imposed on the distance between the poles 9 and 10 and 11 and 12 and 13 and 14; in this case the arrangement of the windings is the decisive factor.

Consider now operation of the proposed position sensor. As the primary windings 15, 16 and 17 of the position sensor are energized, voltage is induced in the secondary windings 18, 19 and 20 (FIG. 3). The voltage across the windings of the rough position finding coils 4, 5 and 6, which are overlapped by the shunting element 8, is several times greater than the voltage across the non-overlapped windings. The arrangement of the inductance coils is known, so by measuring the voltage across the secondary windings, one can find the position of an end face 29 of the shunting element 8. If the upper end face 29 of the shunting element 8 is between two of the coils 4, 5 and 6, the voltage across the secondary windings of one of these coils is several times greater than the voltage across the secondary winding of another coil.

If the coils 4, 5 and 6 are spaced at a considerable distance from one the other, this will mean a rough determination of the position of the shunting element 8.

Figure 4:
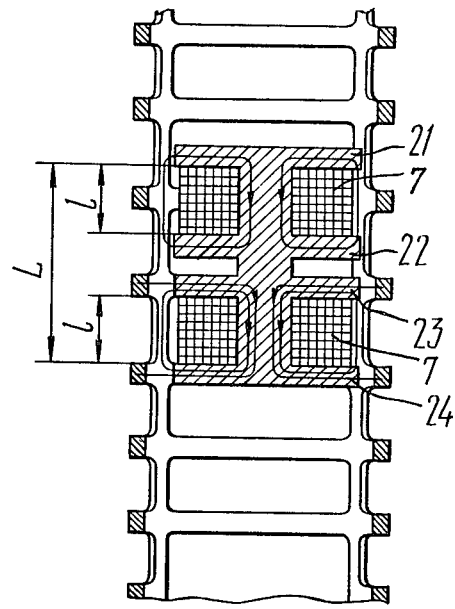
FIG. 4 is an enlarged, sectional view of an inductance coil with two pairs of poles inside a shunting element.

For accurate position finding, use is made of the coil 7 (FIG. 4).

Suppose there is no shunting element in the position sensor.

As the primary windings 25 and 26 (FIG. 3) are energized, voltages of equal values are induced in the secondary windings 27 and 28. These voltages mutually compensate one for the other because the secondary windings 27 and 28 make up a differential circuit; as a result, the voltage at terminals 30 and 31 is zero.

If the shunting element 8 is fitted over the inductance coil 7 and arranged as shown in FIG. 4 (the upper pair of poles 21 and 22 is opposite the groups of holes of the shunting element 8, whereas the lower pair of poles 23 and 24 is opposite the solid position of the shunting element 8, the magnetic flux, which passes through the lower pair of poles 23 and 24 and is closed through the shunting element 8, is greater then the magnetic flux which passes through the upper pair of poles 21 and 22, because in this case the shunting element 8 provides a greater conductance for the magnetic flux passing through the lower pair of poles 23 and 24, as compared with the magnetic flux passing through the upper pair of poles 21 and 22. As a result, the voltage across the lower secondary winding 28 is greater than that across the upper secondary winding 27, so there is voltage across the terminals 30 and 31.

Now, if the shunting element 8 is moved upwards, the conductance for the magnetic fluxes passing through the upper pair of poles 21 and 22 and the lower pair of poles 23 and 24 will become equal; hence, the voltages induced in the secondary windings will also become equal, and the voltage across the terminals 30 and 31 will be zero.

As the shunting element 8 is moved further up, the conductance for the magnetic flux passing through the upper pair of poles 21 and 22 becomes greater than that for the magnetic flux passing through the lower pair of poles 23 and 24, and there is an increase in the voltage across the terminals 30 and 31.

A maximum output signal value is observed when one pair of poles (for example, 21 and 22) is opposite the solid portion of the shunting element 8, whereas the other pair of poles (23 and 24) is opposite the groups of holes of the shunting element 8.

Figure 5:
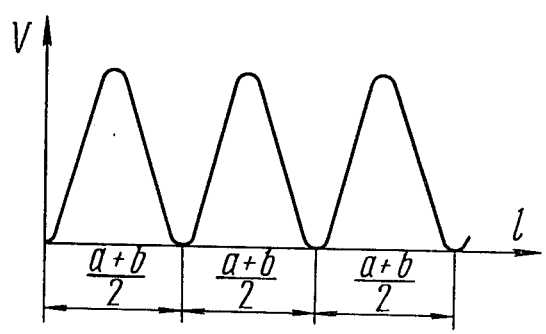
FIG. 5 is a graph showing the relationship between the output voltage of the inductance coil with two pairs of poles and the length of travel of the shunting element.

Maximum voltages alternate as the shunting element 8 moves over a distance $(a+b/2)$, where
"a" is the width of holes of the shunting element; and
"b" is the spacing between the groups of holes (FIG. 5).

The output voltage value is plotted on the y-axis (this is the signal voltage) and the travel length is plotted on the x-axis.

Thus the position of the upper end face 29 of the shunting element 8 is roughly found from the voltages across the adjacent inductance coils 4, 5 and 6, and accurately determined from the number of times the voltage across the terminals 30 and 31 reaches its maximum.

While the invention has been described herein in terms of a preferred embodiment, numerous variations may be made in the proposed position sensor illustrated in the drawings and herein described without departing from the spirit and scope of the invention. For example, the shunting element may be composed of a plurality of rings of a magnetically conducting material spaced along the travel axis of the linearly moving body and interconnected by magnetically conducting bridges.

The proposed position sensor provides for a highly accurate determination of the position of a body in linear motion.

What is claimed is:

1. A position sensor for determining the position of a body in linear motion comprising:
   a plurality of inductance coil means, each having a primary winding and a secondary winding wound on spool like cores and coaxially spaced one after another, an additional coil means coaxially spaced after said inductance coil means and having two primary and two secondary windings, each primary and secondary winding being wound on a respective core of a two spool core, said secondary windings being connected in a measuring circuit, the secondary windings of said inductance coil means indicating coarse movement and the secondary windings of said additional coil means indicating fine movement;
   a tubular shunting element arranged coaxially around said coil means and attached to said linear moving body, for movement along the axis of said coil means, and being provided with groups of holes arranged along the travel path of the linearly moving body, the holes of each group being arranged along the periphery of the shunting element, the distance L between the outer ends of said additional coil means being derived from the following relationship:

$$L = n(a+b) - \tfrac{1}{2}(a+3b),$$

where a is the width of a hole of the shunting element measured along the axis of its travel,
   b is the distance between the groups of holes of the shunting element, and
   n is a natural number beginning with n=3, said shunting element, as it moves along the axis of the coils, shunting the cores of the coils so that a signal is produced in the output circuit of a respective coil, which carries information on the position of the body in linear motion.

* * * * *